United States Patent
Gu (10) Patent No.: US 6,984,688 B2
(45) Date of Patent: Jan. 10, 2006

(54) INJECTION-MOLDABLE TRANSPARENT THERMOPLASTIC ELASTOMER

(75) Inventor: Jiren Gu, Naperville, IL (US)

(73) Assignee: GLS Corp, Arlington Heights, IL (US)

( * ) Notice: Subject to any disclaimer, the term of this patent is extended or adjusted under 35 U.S.C. 154(b) by 246 days.

(21) Appl. No.: 10/428,685

(22) Filed: May 2, 2003

(65) Prior Publication Data

US 2004/0220323 A1    Nov. 4, 2004

(51) Int. Cl.
  *A61J 11/00*  (2006.01)
  *C08K 5/01*  (2006.01)
(52) U.S. Cl. ............ 524/476; 524/481; 524/505; 215/11.1
(58) Field of Classification Search ........ 524/476, 524/481, 505; 215/11.1
  See application file for complete search history.

(56) References Cited

U.S. PATENT DOCUMENTS

| | | | |
|---|---|---|---|
| 4,814,375 A | * | 3/1989 | Esposito ............ 524/505 |
| 5,544,766 A | | 8/1996 | Dunn et al. |
| 5,777,031 A | | 7/1998 | Djiauw et al. |
| 6,106,011 A | | 8/2000 | Masubuchi et al. |
| 6,399,696 B1 | | 6/2002 | Toyosawa et al. |

FOREIGN PATENT DOCUMENTS

| JP | 8 176368 A | 9/1996 |
|---|---|---|
| JP | 2002348433 | 4/2002 |

* cited by examiner

*Primary Examiner*—Peter Mulcahy
(74) *Attorney, Agent, or Firm*—Alfred D. Lobo (57) ABSTRACT

A plasticized HSBC blended with polypropylene and free of a filler material which adversely affects clarity, provides an injection-moldable composition for an article required to have specific properties, namely, tensile strength in the range from about 4.13 to 8.96 MPa (600 to 1300 psi); tear strength in the range from about 21 to 52.6 N/mm (120 to 300 lbs/in); softness in the range from about 45 but less than 65 Shore A; and haze less than 20%, measured by ASTM D1003 using a BYK Gardner Micro Tri-gloss 4525 meter; and it is essential that all of these properties, along with the physical dimensions of the molded article, remain substantially unchanged after immersion of the article in boiling water for 1 hour. Such a composition is may be injection molded to form a nipple for feeding an infant, or a teething ring, or goggles for a diver, and the articles are sterilizable and recyclable.

14 Claims, 1 Drawing Sheet

INJECTION-MOLDABLE TRANSPARENT THERMOPLASTIC ELASTOMER

BACKGROUND OF THE INVENTION

1. Field of the Invention

Novel injection-moldable articles of a hydrogenated triblock copolymer such as nipple bodies (for use on a bottle to feed an infant), teething rings, or pacifiers; and extrudable medical tubing. Such articles of the highest quality are currently molded from a relatively soft silicone (polysiloxane) which is substantially permeable to visible light. The articles are required to have properties which allow the articles to be mouthable or bitable by an infant. Such a silicone is not recyclable. An injection-moldable thermoplastic elastomer ("TPE") derived from a styrene-conjugated diene-styrene triblock blended with a polyolefin and tailored to mimic the physical properties of the bite-resistant silicone articles, is recyclable.

2. The Problem

The aforementioned articles are currently molded from one, or a blend of polysiloxanes (silicones), the blend chosen to provide desirable targeted properties of tear strength, tensile strength, softness and lack of haze (or clarity), as well as to be able to withstand boiling water for an hour without any measurable distortion. But a silicone is not recyclable into fresh product because it is not thermoplastic; and, inability to injection mold a silicone adds to cost of production of formed articles. The goal is to substitute a thermoplastic, injection-moldable copolymer for the silicone while providing essentially the same physical properties as those of the targeted silicone.

3. Addressing the Problem

Moldable articles such as nipple bodies, teething rings and pacifiers are typically made from a silicone which has specified desired properties; but molding a silicone article is relatively expensive since it is not thermoplastic. The desired properties of a typical "nipple grade" silicone are as follows: tensile strength near 6.9 MPa (1000 psi); tear resistance near 35 N/mm (200 lb/in); heat resistance to withstand sterilization temperatures near 100°C. without losing dimensional stability; hardness no greater than Shore A 65; and lack of substantial haze to provide "see-through" clarity so as to provide visual indication of cleanliness. Though haze and clarity are measured differently, only haze is measured herein, on the basis that substantial lack of haze, less than 20%, provides a substantially transparent injection molded material. The combination of tear strength and tensile strength provides bite-resistance.

A silicone having the aforesaid desired properties is used in premium mouthable articles because a silicone can be formulated with the desired physical properties and also be substantially transparent. Being able to see through a nipple body makes it easy for a caregiver to determine that the nipple body appears to be clean, and, when in use to feed an infant, to determine whether the infant is drawing liquid through the nipple or teat. By "substantially transparent" is meant that the molded composition has substantially no haze, that is, less than 20%, typically from 15% –20%, for a plaque 1.7 mm thick, measured with a BYK Gardner Micro Tri-gloss 4525 meter and ASTM D1003 test procedure. Haze below 20% permits a "see-through" property sufficient to allow one to read black letters printed in 12 point font on a white surface through a thickness of about 1.7 mm (0.125 in) held 15 cm away from the surface. Though rubber latex nipple bodies (hereafter "nipples" in deference to common usage) are less expensive, they typically have a haze>20% and are deemed substantially opaque. Haze below 20%, i.e. <20%, is deemed equivalent to acceptable clarity.

TPE block copolymers having blocks of a vinylaromatic monomer and a conjugated diene monomer (referred to herein as a "SBC" irrespective of the monomers chosen, because typically styrene is the vinylaromatic monomer chosen) and high melt viscosity, are routinely blended with a polyolefin such as polypropylene (PP) to provide an injection-moldable blend but it is difficult to predict the properties of the blend. For example, a blend of styrene/butadiene/styrene or a styrene/isoprene/-styrene block copolymer with PP, by mechanical kneading and extruding, results in so many variables coming into play that the distribution of rubbery domains is not predictable. Not least of these variables is the ratio of SBC to PP; when there is more PP by weight than SBC, the properties are different from those when there is more SBC than PP. Moreover, the physical properties of the SBC are mainly determined by its molecular weight (or melt index), the ratio of styrene to rubber blocks, and the extent (mole %) of vinyl linkages in the rubbery midblock. It is known that the higher the molecular weight of a SBC relative to another, all other criteria being the same, the higher the tensile strength and tear strength of a blend with PP, used in same amount and having the same melt index. But one cannot predict other properties of the blends, nor make a close estimate of the improvement in tensile and tear strengths. Thus to get high tensile and tear strengths one is inclined to choose a SBC having a number average molecular weight in excess of about 150,000(measured by gel permeation chromatography (GPC), (hereafter "Mn" for brevity). But such "high Mn" substantially transparent commercially available SBCs are not substantially transparent when blended with sufficient PP to form a continuous phase so as to have a hardness below Shore A 65. It is also known that SBCs having a relatively low Mn, less than about 150,000are substantially transparent, but they have unacceptable tensile and tear strengths when blended with sufficient PP to form a continuous phase so as to have a hardness below Shore A 65.

The foregoing is also true for a substantially fully hydrogenated SBC (referred to herein as a "HSBC") blended with polypropylene, except that the clarity of a "high vinyl" HSBC having a Mn in the range from about 100,000 to 170,000 is better than that of an unhydrogenated SBC having the same Mn.

By "high vinyl" is meant that at least 51 mole % (percent) of the butadiene midblock is polymerized at the 1,2-position, and at least 51 mole % of the isoprene, if present, is polymerized at the 3,4-position by "driving" the polymerization with addition of a polar compound, as is well known in the art; typically the maximum in each case is 90 mole %. Such HSBCs are referred to as "high vinyl" HSBCs whether either butadiene or isoprene, or both, are present in the midblock.

A single high vinyl HSBC having Mn in the range above about 170,000, when blended with a minor proportion by weight of a homopolymer of a lower olefin, or a copolymer of lower olefins having from 2 to 5 carbon atoms, to provide desirable heat resistance and processability, lacks both essential softness and clarity (haze<20%). However, when a substantially transparent high vinyl HSBC with Mn lower than about 170,000, preferably in the range from about 60,000 but less than 130,000, is blended with the same polyolefin, typically polypropylene, it remains substantially transparent, but is still too hard having a Shore A hardness greater than 65 (>65).

In each blend of high vinyl HSBCs in the Mn range from 60,000 to 170,000, the minor proportion by weight of PP in the blend is sufficient to form a continuous phase which accounts in large part for the good physical properties of the blend, including desirable heat resistance. However, as stated, the good physical properties are typically accompanied by unacceptable hardness, i.e. Shore A hardness>65, thus suggesting the blend be plasticized. But many blends, if plasticized or softened enough to fall in the required range of from Shore A 45 to less than Shore A 65 when injection molded or extruded, the plasticizer (or softening agent) tends to migrate to the surface and adversely affects both the feel and the usability of the molded product and/or the blends have relatively poor tensile and tear strengths.

U.S. Pat. No. 5,544,766 discloses a nipple for a baby bottle which is fabricated from a flexible material, "usually latex, vinyl, silicone or thermoplastic elastomers (TPEs)". There is no indication in the '766 disclosure as to what particular TPE or blend of TPEs might be used as an acceptable substitute for a substantially transparent silicone for which no physcial properties are provided. Since there is no suggestion as to how to arrive at a suitable TPE substitute for the unspecified silicone, much less specifications to enable one skilled in the art to produce a satisfactory TPE substitute, it is evident that it would require an undue amount of experimentation to arrive at those specifications. The invention disclosed herein is the result of having done the necessary experimental work.

A commonly available SBC is said to be partially hydrogenated when it has from about 20 to 50% olefinic unsaturation; but when the SBC is further hydrogenated to a HSBC containing less than 10% olefinic unsaturation, it is commonly regarded in the art as being substantially fully hydrogenated. The physical properties of an unhydrogenated SBC having a molecular weight essentially identical to that of a HSBC (substantially fully hydrogenated SBC) are typically quite different from those of the HSBC due to the interaction of the rubbery phases which have different chemical structures. In this invention, unhydrogenated SBCs are found to have unacceptable properties. In particular, only substantially fully hydrogenated (A)-(B)-(A) type "HSBC" wherein (A) represents a polystyrene block and (B) represents a polybutadiene or polyisoprene block, or a "mixed" poly(butadiene-isoprene) block, having less than 30% unsaturation, preferably less than 20% unsaturation, lend themselves to being incorporated in a heat stable, oxidation-resistant TPE of this invention.

It is known that the morphology of hydrogenated (A)-(B)-(A) type HSBC changes as the ratio of (A) to (B) changes; and it changes further depending upon the amount of polypropylene blended with the HSBC; but there is no teaching as to how such morphology might affect tear strength, tensile strength and/or clarity when various mixtures of HSBCs blended with polypropylene are molded. Thus, knowing the tensile and tear strengths of a specific hydrogenated (A)-(B)-(A) block copolymer having a specified molecular weight blended with a chosen amount of polypropylene, and knowing the specified ratio of molecular weights of the (A) and (B) blocks, it is not possible to estimate, with any reasonable degree of certainty, the tensile strength, tear strength and clarity of another block copolymer with a different molecular weight but the same (A)/(B) ratio of molecular weights and the same amount of polypropylene; or, with a different (A)/(B) ratio and the same molecular weight and amount of poly-propylene; making an estimate is even more difficult when that block copolymer blended with polypropylene is molded with relatively large amounts of additional ingredients.

The degree of uncertainty is further increased when two block copolymers with different characteristics are blended, and two of the added ingredients (polypropylene and plasticizer) are added in relatively large amounts to affect phase distribution and domain size. The challenge of providing an appropriate blend for a particular article to be molded, has been addressed in the prior art.

To provide a moldable cover for a cavity containing a deployable air bag, U.S. Pat. No. 6,106,011 teaches a mixture having a specified ratio of two hydrogenated block copolymers, each having a molecular weight in a specified range and a specified proportion of blocks, which mixture is further modified by a polyolefin having a specified melt flow rate, and optionally with a hydrocarbon oil. In the unlikely event that one seeking to mold a nipple for a baby's bottle would stumble upon a cover for an air bag and divine that it may have a suggestion to help address the problem of mimicking a silicone nipple with a mixture of HSBCs, he will not find one.

U.S. Pat. No. 6,399,696 teaches a recipe useful to make a gasket material, comprising 100 parts by weight of a HSBC of a vinyl aromatic compound and a conjugated diene compound mixed with from 50 to 1000 parts of a non-aromatic base softening agent having a kinematic viscosity at 40° C. of at least 100 mm$^2$/sec, and from 1 to 100 parts of polypropylene or a propylene copolymer. The end product is a TPE which has a Shore A hardness greater than 65, and therefore unacceptable for the articles of this invention. Understandably, there is no indication in the '696 patent as to what the tensile and tear strengths are of the compositions they teach since neither property is of concern in a gasket material.

No prior art reference teaches how to choose the particular ingredients for a TPE which when injection molded, will yield an article with targeted physical properties, particularly a combination of dimensional stability at 100° C., hardness, clarity (lack of substantial haze), tensile and tear strengths. Though blends of HSBCs are modified with a polyolefin and plasticized in the prior art, it does not teach how to choose appropriate HSBCs having defined properties, or how to combine these HSBCs with what other ingredients, in a recipe for a blend which will yield an injection molded article with specific, targeted properties. In particular there is nothing to suggest that a blend of a high vinyl HSBC, when blended with polypropylene and a plasticizer would provide the foundation for an injection-moldable block copolymer which could mimic the properties of a silicone.

Hydrogenated high 1,2-HSBCs are disclosed in U.S. Pat. No. 5,777,031 to Djiauw et al the disclosure of which is incorporated by reference thereto as if fully set forth herein. The high 1,2-polymers, which had end blocks each having a Mn of at least 20,000 and Mn>130,000 for the entire polymer, were found to have better softness than polymers with the same ratio of styrene to butadiene but a 1,2-addition lower than 51 mole percent. But blends of such high 1,2-HSBCs with PP and mineral oil, failed to have adequate clarity, that is, minimal haze (<20%), if they were in the required range of hardness, or had the required strength. Nor is there any suggestion in the '031 patent that a "high vinyl" HSBC blend might be substantially transparent provided that its resultant effective Mn was below 130,000.

By "resultant effective Mn" is meant the Mn arrived at by combining the Mn of each HSBC in the proportion it is present in the blend, divided by the number of HSBCs in the blend.

Testing indicated that no single high vinyl HSBC having Mn>130,000, when blended with PP and plasticized, without blending with a dynamic vulcanizate of an engineering thermoplastic and an acrylate rubber, provides properties mimicking those of a soft, tough, transparent silicone such as is used in a nipple for feeding an infant.

SUMMARY OF THE INVENTION

It was found that one or more first HSBCs specifically derived by hydrogenation of a high vinyl styrene-butadiene-styrene (SBS) triblock to yield "polystyrene-b-poly (ethylenelbutylene)-b-polystyrene" or high vinyl"SEBS" (so termed because of its derivation from high vinyl SBS), or, a high vinyl styrene-isoprene-styrene (SIS) triblock to yield polystyrene-b-poly(ethylene/propylene-3-methylbutene)-b-polystyrene or a high vinyl "SEPS", or, a high vinyl poly (styrene-b-isoprene/butadiene-b-styrene) (SI/BS) triblock to yield "polystyrene-b-poly(ethylene-ethylene/propylene)-b-polystyrene" or "SEEPS", optionally blended with a second HSBC so as to have a resultant effective number average molecular weight (Mn) measured by gel permeation chromatography (GPC), critically less than 130,000, preferably in the range from above about 60,000 to less than 130,000, when blended with polypropylene, plasticized with a plasticizer for the rubbery phase, in an amount which will not visually diminish the see-through clarity of the blend, and modified with a compatible end block modifier present in a minor proportion by weight relative to the HSBC, which end block modifier associates with the polystyrene, provides excellent softness and adequate tensile and tear strength, all of which are critical in a shaped article specifically designed to be mouthable by an infant, or in medical tubing and related articles which, in use, come in contact with body fluids.

By "compatible end block modifier" is meant that compatibility is determined by the highest glass transition temperature Tg which will yield a cloud point at 30° C. or lower in a solution of methylcyclohexane and aniline present in a ratio of 1:2 (the cloud point is referred to as MMAP in Eastman Chemical's product brochure); preferably the Tg of the end block modifier is in the range from about 60° C. to 140° C. preferably 80° C. to 120° C.; and the weight average molecular weight of the end block modifier Mw is in the range from about 2000 to 50,000, preferably from 10,000 to 30,000, used in an amount in the range from 5 to 40 phr (parts per 100 parts) of HSBC. Preferred are copolymers of aromatic monomers which result in a water white, heat stable and oxidation resistant end block modifier.

In the foregoing blend, the second HSBC is SEEPS having a resultant effective Mn of less than 130,000 (if more than one SEEPS is present), which may or may not be high vinyl; that is, the SEBS and/or SEPS and/or SEEPS, each of which is high vinyl, may be blended with SEEPS which is not high vinyl. Alternatively, the SEBS and/or SEPS, each of which is high vinyl, may be blended with SEEPS which is high vinyl.

In particular, a blend of a first high vinyl HSBC comprising at least one high vinyl HSBC having Mn no higher than 170,000 blended with a minor proportion by weight, relative to the weight of the high vinyl HSBC, of a second HSBC, preferably a SEEPS, a portion of which may be high vinyl, so that the resultant effective Mn is less than 130,000, and polypropylene, plasticizer and end block modifier, provides the desired properties. If only a single high vinyl HSBC is present, it has Mn<130,000, preferably from about 80,000 to 125,000.

A high vinyl SEBS/SEPS and a SEEPS in which the SEEPS has a lower Mn (referred to as a "low Mn SEEPS") than either the SEBS or SEPS (referred to as a "high Mn high vinyl SEBS/SEPS"), when together blended to provide a resultant effective Mn from above about 60,000 but lower than 130,000, preferably less than 125,000, and also blended with minor proportions by weight of each, polypropylene, plasticizer, and end block modifier, relative to the HSBC, that is, the high vinyl SEBS/SEPS/-SEEPS, provides the critical physical properties demanded of a plasticized HSBC/PP blend, provided the plasticizer is compatible with the rubbery (hydrogenated midblock) segment.

A plasticized high vinyl HSBC blended with polypropylene and an end block modifier, and free of a filler material which adversely affects the clarity of molded polymer, provides an injection-moldable composition for an article required to have specific properties, namely, tensile strength in the range from about 4.18 to 8.96 MPa (600 to 1300 psi); tear strength in the range from about 21 to 52.6 N/mm (120 to 300 lbs/in); softness in the range from about 45 Shore A but less than 65 Shore A; and haze less than 20% measured as indicated above; and it is essential that all of these properties, along with the physical dimensions of the molded article, remain substantially unchanged after immersion of the article in boiling water (at atmospheric pressure) for 1 hour.

Most preferred for making an infant-mouthable article is a blend of a SEBS and a SEEPS in which the blend contains less than 42.5% by weight of SEBS, based on the weight of the molded blend, and no component of the molded blend is extractable under conditions of use, or conditions of sterilization, in an amount which is deemed toxic to the infant.

BRIEF DESCRIPTION OF THE DRAWING

The foregoing and additional objects and advantages of the invention will best be understood by reference to the following detailed description, accompanied with a schematic illustration of a preferred embodiment of the invention, in which.

DETAILED DESCRIPTION OF PREFERRED EMBODIMENTS

The high vinyl(S)-(B)-(S) block copolymers used herein are commercially available and routinely prepared by either sequential polymerization or coupling as described in the '031 patent.

A (S)-(B)-(S) copolymer is made in the sequential polymerization technique, when the monovinyl aromatic monomer is first introduced to produce an aromatic block followed by the introduction of the butadiene monomer to produce the rubbery midblock followed by additional monovinyl aromatic compound to produce the other terminal aromatic block. The disclosures of Holden in U.S. Pat. No. 3,231,635 (Jan. 25, 1966) and Stevens et al, U.S. Pat. No. 5,194,530 (Mar. 16, 1993) relating to production of such copolymers are incorporated by reference thereto as if fully set forth herein. Another relevant disclosure by Bean in U.S. Pat. No. 4,764,572 (Aug. 16, 1988) relating to the anionic polymerization of thermoplastic elastomers using an organo alkali metal initiator is also incorporated herein by reference thereto.

It is well known in the art to alter the structure of a typically obtained random 1,4- and 1,2-addition block copolymer, referred to as having "low vinyl" midblocks, by driving the polymerization toward the 1,2-addition of butadiene by utilizing an organic polar compound such as an ether or an amine, preferably chelating ethers and amines, referred to as microstructure promoters. By chelating ether is meant an ether having more than one oxygen as exemplified by the formula $R(OR')_m (OR")_o OR$ where each R is individually selected from 1 to 8, preferably 2 to 3, carbon atom alkyl radicals; R' and R" are individually selected from 1 to 6, preferably 2 to 3, carbon atom alkylene radicals; and m and o are independently selected integers of 1-3, preferably 1-2. Examples of preferred ethers include diethoxypropane, 1,2-dioxyethane (dioxo) and 1,2-dimethyoxyethane (glyme). By chelating amine is meant an amine having more than 1 nitrogen such as N,N,N',N'-tetramethylethylene diamine.

The promoter is used in an amount of at least 0.1 moles per mole of lithium compound, preferably 2–25 moles of promoter per mole of the lithium compound, or, based on the total weight of solvent and monomer, from 100 ppm (parts per million) about 0.2 weight percent. The techniques are well known in the art, disclosed for instance in Winkler, U.S. Pat. No. 3,686,366 (Aug. 22, 1972), Winkler, U.S. Pat. No. 3,700,748 (Oct. 24, 1972) and Koppes et al, U.S. Pat. No. 5,194,535 (Mar. 16, 1993), the disclosures of which are hereby incorporated by reference.

The SBCs utilized in the compositions of this invention are selectively hydrogenated so as to remove most, preferably more than 80% of both the vinyl and the ethylenic unsaturation in the polymer backbone, leaving the aromatic unsaturation unaffected. Suitable known catalysts for accomplishing this include nickel compounds in combination with a reducing agent such as an aluminum alkyl, and such hydrogenation is taught in Shaw, U.S. Pat. No. 3,634,549 (Jan. 11, 1972), De la Mare, U.S. Pat. No. 3,670,054 (Jun. 13, 1972), Wald et al, U.S. Pat. No. 3,700,633 (Oct. 24, 1972) and Jones, Re 27,145 (Jun. 22, 1971), the disclosures of which are hereby incorporated by reference.

A preferred HSBC is typified by a fully hydrogenated (S)-(B)-(S) multiblock in which blocks (S) and (B) are present in a defined molecular weight range, and with a defined ratio of molecular weights of the (S) and (B) blocks. The HSBC has been found uniquely susceptible to being blended with a controlled amount of a softening agent, preferably mineral oil, and uncrosslinked poly(lower olefin) polymer having a melt index in the range from 1 gm/10 min to 150 gm/10 min using ASTM D-1238-F, and up to about 400 gm/10 min using ASTM D-1238-E, to produce a molded article having the aforespecified properties, provided the HSBC is formulated with an end block modifying agent, preferably one having a glass transition temperature Tg higher than 60° C. Preferably the weight ratio of diene/styrene is in the range from 65/35 to 80/20; the molecular weight of the (S) block is in the range from about 10,000 to 30,000 and that of the (B) block is in the range from about 50,000 to 120,000. The vinyl aromatic blocks are derived from a monomer such as styrene, vinyl toluene, α-methyl styrene, α-ethylstyrene, methoxystyrene and the like, most preferably styrene. The hydrogenated diene blocks are the only source of the rubbery phase in the TPE which rubbery phase is dispersed in the poly(lower olefin) provided in an amount sufficient to form a continuous phase. For making an infant-mouthable article injection moldable crystalline polypropylene homopolymer (PP) which preferably has a melt flow rate in the range from about 5 to 100 g/10 min, measured at 230° C. and a load of 2.16 Kg (ASTM D1238); crystallinity typically greater than 50%; and a melting point in the range from 140° C. to 165° C., is used. Such an article is referred to as being "clear and soft". Extrusion grade PP may also be used for extruded clear and soft articles.

Preferred ingredients for blending with the HSBC are (1) a homopolymer of a lower olefin, or a copolymer of lower olefins having from 2 to 5 carbon atoms, the preferred olefin being propylene, and (2) a softening agent or plasticizer such as a mineral oil compatible with the rubbery phase of the block copolymer.

Each individual aromatic end block preferably has Mn in the range from about 20,000 to 50,000, more preferably 25,000 to 40,000, most preferably 25,000 to 37,000.

To tailor a blend which can be thermoformed into a clear and soft article such as an injection-molded substantially transparent nipple, or other relatively soft but strong and tear-resistant product such as the mounting frame for lenses of a pair of goggles for skiing or scuba diving, it was found necessary to add an end block modifying resin to the recipe. The end block modifier provides a morphology which increased both the tensile and tear strengths without increasing the hardness to an unacceptable level.

Each of the components present in an amount greater than 5 parts by weight of the HSBC is necessarily substantially transparent. Each such component is to be chosen so as to be substantially inert, that is, having essentially no chemical interaction with one and another, because such reactive interaction is sufficient to be detrimental to the clarity of the molded TPE.

The hydrogenated block copolymer is obtained by hydrogenating the block copolymer which consists essentially of at least one polymer block of a vinylaromatic compound, preferably styrene, and at least one polymer block of a conjugated diene, preferably butadiene. The non-crystalline styrene blocks provide the major portion by weight, from about 20% to 35%, in the hydrogenated block copolymer. The non-crystalline styrene blocks have a glass transition temperature Tg in the range from 60° C. to 100° C. In addition, noncrystalline styrene blocks are preferable as polymers for linking the noncrystalline styrene blocks at both the ends. A particular hydrogenated high vinyl SEBS may be used alone, but if the TPE is to be used for a nipple, pacifier or teething ring, it is preferred that the high vinyl SEBS random block copolymer be used in combination with at least one high vinyl SEEPS random block copolymer having properties in the ranges specified above.

For the purpose of lowering the hardness of the TPE it is necessary to blend therein a substantially transparent nonaromatic base softening agent having a kinematic viscosity in the range from 10 to 500 $mm^2$/sec (10–500 cSt) at 40° C. A viscosity lower than the specified lowest viscosity, results in substantial weight loss of molded TPE due to volatilization which is unacceptable in the molded TPE. A preferred softening agent has a viscosity in the range from 40–100 $mm^2$/sec at 40° C., more preferably 45 to 90 $mm^2$/sec at 40° C., measured by ASTM D 445. The weight-average molecular weight Mw of the softening agent is preferably less than 10,000, more preferably less than 5,000. Such a softening agent is preferably liquid or in the form of liquid at room temperature, and has a solubility parameter±20% of that of the elastomeric midblock.

The desired softening agent may be selected from a variety of essentially colorless non-aromatic compounds having mineral oil, vegetable oil, or synthetic bases having a flashpoint above about 150° C. Examples of a mineral oil base include oils with a paraffinic base. Examples of vegetable oils include castor, cotton seed, linseed, rapeseed, soybean, palm, coconut, arachis, Japan wax, pine, and olive oils. Of these, are preferable an oil and at least two oils each having a weight-average molecular weight in the range of 200 to 2,000, and being selected from among mineral oil-base paraffinic oil, naphthenic oil, and synthetic-base polyisobutylene base oil. Any of these softening agents may be used alone or as a component in the mixture of at least two agents. Most preferred is a paraffinic oil having a flashpoint above 200° C., Mw in the range from 400 to 1400 and a viscosity in the range stated above.

The blending amount of any suitable softening agent is in the range of from about 45 to less than 100 parts by weight, and preferably from 45 to 90 phr (parts by weight of a mineral oil used, based on 100 parts by weight of the HSBC). Blending less than 40 phr of the oil results in failure to sufficiently lower the hardness, thereby causing insufficient softness or flexibility of the thermoplastic elastomer composition. Blending 100 phr or more of the oil results in the softening agent bleeding out and the TPE article to deteriorate in mechanical strength. Moreover, it is preferable that the blending amount of the softening agent be selected at a value in the foregoing range in accordance with the molecular weight of the HSBC.

To provide the continuous phase in the TPE a commercially available conventional propylene homopolymer and/or propylene copolymer comprising propylene as a principal component, may be used. Isotactic polypropylene and atactic polypropylene are typically obtained by polymerizing propylene in the presence of a Ziegler catalyst (titanium base). If desired, syndiotactic homo/co polypropylene (sPP) or metallocene isotactic polypropylene (iPP) may be used. A random copolymer of propylene and an α-olefin such as ethylene or 4-methyl-1-pentene is obtained by polymerization in the presence of a small amount of the α-olefin; a block copolymer of propylene-ethylene is obtained by making the propylene homopolymer, and then polymerizing ethylene. The preferred PP used has in excess of 70% isotactic linkages, typically more than 90% and its MFR is in the range from 10 to 100 gm/10 min, preferably 10 to 50 gm/10 min measured in accordance with ASTM D1238.

To provide the optimum desired properties in the TPE it is critical that an essentially colorless low Mn end-block modifying resin be used. Because such end-block modifying resins are generally non-elastomeric, compatible or miscible with the polystyrene end block, and substantially incompatible with the elastomeric midblock, only those having a glass transition temperature $T_g$ >60° C. are used, preferably in the range from about 10 to 30 phr of HSBC. Such compatibility is indicated by a substantially haze-free film being formed upon casting, from toluene solution, a blend of at least 50 parts of the end block associating resin and 100 parts of styrene. End block modifying resins are chosen from the general chemical class of aromatic, thermoplastic hydrocarbons. Such end block associating resins include aromatic compounds having an unsaturated side chain, e.g. alkyl-aromatic thermoplastic hydrocarbon resins, polystyrene resins, poly(α-methylstyrene-vinyl toluene) copolymers, polyindene resins, coumarone-indene resins, and the like.

The TPE is preferably stabilized with primary antioxidants such as hindered phenols including those commercially available as Irganox 1010, 1076 and B215; with secondary antioxidants functioning as thermal processing stabilizers including those commercially available as Irgafos 168, PS802; and additionally with hindered amine light (UV) stabilizers commercially available as Tinuvin ill, and, if a substantially transparent article is not required, pigments such as titanium dioxide and carbon black. The TPE in addition to the foregoing, is preferably stabilized with salts of lower carboxylic acids such as alkali metal citrates, salts of phosphoric acid, polyols, or epoxidized oils, and a thermal stabilizer such as a dibutyl tin stabilizer in an amount from about 0.01 to about 2 parts by weight per 100 parts PO. These other stabilizers may be used in amounts from about 0.1 to about 7 parts by weight. Lubricants such as Dynamar® fluorinated flow aids, paraffin waxes, low molecular weight polyethylene, oxidized polyethylenes, fatty acids and their salts, fatty alcohols, metal soaps, fatty amides, fatty esters, can be included.

The TPE composition of the present invention is achieved using processing equipment, which is typical for such materials. For example, in the preferred process, the ingredients will be weighed, pre-blended, mixed in a Banbury mixer, then passed through two 2-roll mills, a strainer extruder, and finally, calendered on an inverted "L" calender.

A first specific TPE composition moldable into a nipple, pacifier or teething ring, and having properties stated above consists essentially of (a) 100 parts by weight of a mixture of first and second thermoplastic hydrogenated block copolymers (HSBCs), the blend having a resultant effective Mn in the range from about 60,000 but lower than 130,000, each HSBC consisting of a vinylaromatic compound, preferably styrene which provides a plastic phase, and a hydrogenated diene, preferably butadiene or isoprene, or both, which provides a rubbery phase; the midblock of the first HSBC is necessarily derived from a high vinyl SBC selected from the group consisting of poly(styrene/butadiene/styrene) and poly(styrene/isoprene/styrene); the second HSBC is chosen from a SBC derived from poly(styrene-b-isoprene/butadiene-b-styrene) having (i) 35 mole % vinyl unsaturation or less, and (ii) more than 35 mole % unsaturation; Mn of the vinylaromatic block is in the range from about 10,000 to 30,000, and the Mn of the hydrogenated diene block is in the range from about 40,000 to 120,000, the ratio of the molecular weights of the vinylaromatic block to the hydrogenated rubber block being in the range from 20:80 to 35:65; (b) from about 15 to 50 parts by weight of a polyolefinic modifier providing a continuous phase in the TPE, the polyolefinic modifier being polypropylene homopolymer, or a copolymer of propylene with another lower olefin having from 2 to 6 carbon atoms, the modifier having a melt viscosity in the range stated above; (c) from 5 to 40 parts of an end block modifier compatible with the polystyrene domains of the blend; and (d) from about 45 to less than 100 parts of a non-aromatic mineral oil per 100 parts of block copolymer for softening. Preferably, the polypropylene is the continuous phase in which the rubber and plastic phases are distributed, and the size of the domains are controlled by (e) a small amount in the range from about 0.1 part to about 1 part of a nucleating agent; and in addition, the TPE may contain (f) from about 1 part to about 5 parts of each of the following: a stabilizer, colorant if desired, processing aid, antioxidant, etc.

In a preferred embodiment there is provided a thermoplastic blend consisting essentially of
(a) 100 parts by weight of a substantially transparent HSBC having a resultant effective Mn lower than 130,000 and selected from the group consisting of (i) a high vinyl SEBS and (ii) a mixture of a high vinyl SEBS and SEEPS in which mixture SEEPS is present in an amount (by weight) less than the amount of SEBS, and some or all of the SEEPS may be high vinyl;
b) 20 to 50 parts by weight of polypropylene having a melt flow rate of from 10 to 100 gm/10 min as measured at 230° C. under a load of 2.16 kg in accordance with ASTM D1238;
(c) 50 to 90 parts by weight of a substantially colorless hydrocarbon oil having a kinematic viscosity at 40° C. in the range from 100 to 300 mm$^2$/sec.; and,
(d) 5 to 40 parts by weight of a vinylaromatic end block modifier having a Tg>60° C., a MMAP cloud point<30° C. and Mw in the range from about 20,000 to 30,000; and,
(e) less than 5 parts by weight of one or more additives including a nucleating agent to control the size of domains and stabilizer to enhance the useful life of the molded product.

Preferably, the high vinyl SEBS or SEPS, and the SEEPS which optionally may also be high vinyl, includes from 15 to 45% by weight of polystyrene blocks, prior to the hydrogenation, based on the weight of the SEBS and/or SEPS and/or SEEPS; each has a Mn in the range from about 65,000 to 170,000 but, if more than one having a different Mn is used, the combination has a resultant effective Mn in the range from about 65,000 to less than 130,000.

In a mixture of high vinyl SEBS and optionally high vinyl SEEPS, the aforesaid SEBS is preferably present in an amount in the range from about 70 to 100 parts by weight, and the SEEPS is present in the corresponding range of from 0 to 30 parts by weight. The SEEPS preferably is derived from a SBC having from 55 to 85% by weight of poly(butadiene-isoprene) blocks, prior to the hydrogenation, based on the weight of the SEEPS.

The compositions described in the foregoing paragraphs are each thermally moldable at a temperature below that which degrades the recited properties, to provide a generally dome-shaped cap member for a baby's nursing bottle, the cap member including a nipple having a perforation in the tip thereof for discharging a regulated liquid nourishment; or, to provide a conventional pacifier or teething ring for an infant to suck, bite or chew on.

Figure 1:
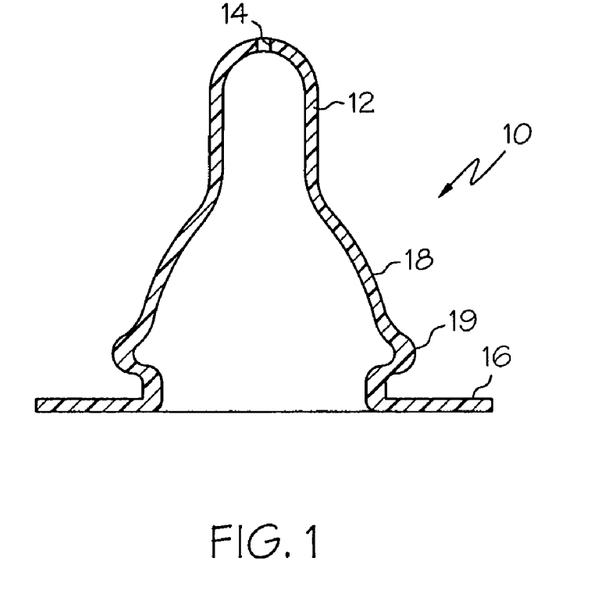
FIG. 1 is a side elevation cross-sectional view of a conventional nipple body which is to be secured to the mouth of a bottle for feeding an infant.

Illustrative of an article which is injection molded from the novel composition at a temperature above its melt flow temperature, preferably in the range from about 175° C. to about 275° C. is a nipple body, referred to generally by reference numeral 10, illustrated in FIG. 1 wherein the body includes a nipple or teat 12 in which a central through-aperture 14 is provided. The body 10 is molded in the general shape of an inverted cylindrical truncated cone and includes an integrally formed annular flange 16 the inner periphery of which is integrally joined to the nipple 12 in a smooth gently flaring curved wall 18. The lower portion 19 of the wall 18 may be flared or thickened to provide reinforcement.

The molded shape of the nipple body is not narrowly critical since the composition of this invention is well adapted to be injection molded into a nipple body of any shape.

Figure 2:
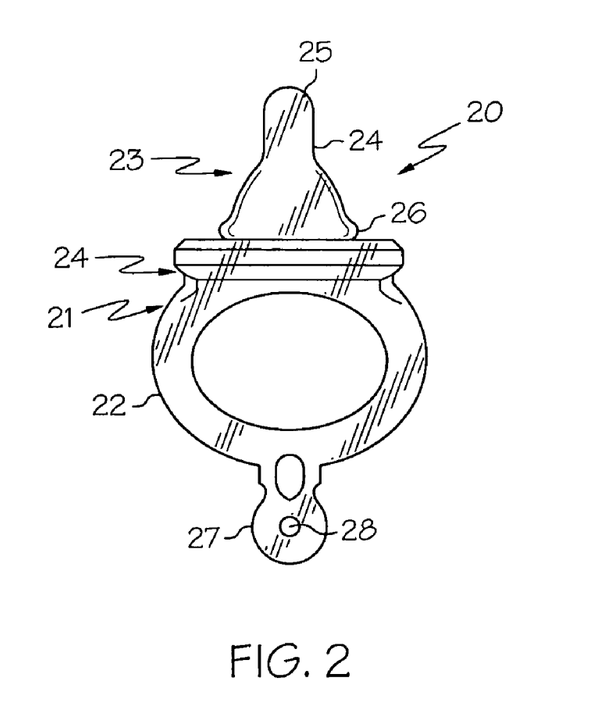
FIG. 2 is a side elevation partially in cross-section, illustrating a conventional combination of a teething ring and pacifier.

Referring to FIG. 2, there is shown another article, a combination pacifier and teething ring referred to generally by reference numeral 20, which is molded from the composition of this invention. The article comprises a unitary hollow body 21 which includes a teething ring 22 and a nipple body portion 23 with a hollow guard portion 24 interconnecting the teething portion 22 and the nipple portion 23. The teething ring 22 is of elliptical shape with opposed transversely curved walls having a generally circular cross-section. The nipple portion 23 comprises a tapering tubular portion 24 with a hemispherical top wall 25 at the upper end thereof, and an annular collar portion 26 at the lower end thereof. The guard portion 24 is of a generally flat elongated oval shape. The teething ring 22 has a generally doughnut-shaped hanger stub 27 integrally molded with the walls of the teething portion 22 with a central aperture 28.

As with the nipple body illustrated in FIG. 1, the molded shape of the combination pacifier and teething ring is not narrowly critical since the composition of this invention is well adapted to be injection molded into a body of any shape.

In the following illustrative examples, all "parts" refer to parts by weight. Tensile strength is measured by ASTM D412; tear strength is measured by ASTM D624; haze is measured with a 1.7 mm thick plaque using a BYK Gardner Micro Tri-gloss meter; and hardness is measured with a 10 sec delay.

EXAMPLES 1–4

Commercially available ingredients, high vinyl Kraton®GRP6924 (SEBS) and Septon®4033 (SEEPS) triblock copolymers are blended in various proportions with varying amounts of Drakeol®600 mineral oil and fixed amounts of Fina®3860 PP homopolymer and Kristalex®5140 end-block modifier which associates essentially exclusively with the polystyrene phase of the HSBCs. The Fina 3860 PP has a melt flow rate of 75 gm/10 min (ASTM D1238). The Kristalex 5140 is a high softening point, low molecular weight resin produced by copolymerization of pure aromatic monomers. A small amount of Irganox®1010 stabilizer is added to each of the four recipes before each is blended in a Henschel mixer and fed to the hopper of an extruder. Kraton®GRP6924 (SEBS) from Shell Chemical has Mn of close to 130,000 (within experimental error).

Septon®4033 (SEEPS) from Kuraray Chemical has Mn of about 90,000.

The following detailed procedure for Example 3 below, is typical: 80 parts by weight of GRP6924 are mixed with 20 parts of 4033 in a Henschel blender while adding 70 parts of the oil so as to form a wet crumb. 40 parts of the PP 3860 homopolymer, 10 parts of the end block modifier and 0.2 parts of the 1010 are added and mixed until a visually homogeneous mixture is formed. The mixture is then fed to a twin-screw extruder with the barrel temperature controlled at 204° C. (400° F.) to form a rod which is pelletized.

The pellets are loaded into the hopper of a Cincinnati Milacron Vista Sentry VST 55-2-97 injection molding machine with a 38 mm (1.5") barrel to form 15.25 cm×12.5 cm (6"×5") plaques each 38 mm (0.1 5") thick.

TABLE 1

| | Example No. | | | |
|---|---|---|---|---|
| | 1 | 2 | 3 | 4 |
| GRP6924 (SEBS) | 85 | 90 | 80 | 100 |
| 4033 (SEEPS) | 15 | 10 | 20 | 0 |
| Drakeol ® 600 mineral oil | 50 | 65 | 70 | 80 |
| Fina ® 3860 PP homop'mer | 40 | 40 | 40 | 40 |
| Kristalex ® 5140 e-b modif. | 10 | 10 | 10 | 10 |
| Irganox ® 1010 stabilizer | 0.2 | 0.2 | 0.2 | 0.2 |
| Ratio of oil/HSBC | 0.5 | 0.65 | 0.7 | 0.8 |
| Properties | | | | |
| Hardness, Shore A | 63 | 59 | 56 | 45 |
| Tensile strength, Mpa (psi) | 8.67 (1257) | 7.31 (1060) | 6.03 (874) | 5.38 (808) |
| Tear strength, N/mm (lb/in) | 42 (240) | 34 (194) | 29.9 (171) | 22.4 (128) |
| [1]Haze, % | | 20.3 | 15.3 | 17.6 |
| Boiling water* test | pass | pass | pass | pass |

[1]measured by ASTM D1003 using a BYK Gardner Micro Tri-gloss 4525 meter
*Boiling water test is carried out as follows: Injection molded plaques 10 cm × 5 cm × 1 cm thick are immersed in boiling water (100° C.) for 1 hour, then allowed to cool to room temperature. A sample passes the test if each and every dimension changes less than 5%, that is, no dimension changes as much as 5%.

The boiled and cooled samples are then tested for tear strength and tensile strength; a sample passes the tests as long as both the tensile strength and the tear strength, each decrease less than 5% relative to the values obtained before boiling.

EXAMPLE 5

In a manner analogous to that described hereinabove for Example 4, an HSBC blend is prepared with 80 parts high vinyl Kraton(GRP6924 (SEBS) having Mn=129,500 and 20 parts Kraton®GRP6917 (SEBS) having Mn 290,000, the remaining ingredients being the same. The resultant effective Mn of the blend is 161,600. The properties are essentially the same as the properties of Example 4, except that the clarity is unacceptably low.

EXAMPLES 6–7

The following examples demonstrates the effect of controlling domain sizes with a nucleating agent.

TABLE 2

| | Example No. | |
|---|---|---|
| | 6 | 7 |
| Kraton ® G6924 (SEBS) | 80 | 80 |
| Septon ® 4033 (SEEPS) | 10 | 10 |
| Tuftec ® H1041 | 10 | 10 |
| Drakeol ® 600 mineral oil | 65 | 65 |
| Fina ® 3860 PP homopolymer | 40 | 40 |
| Kristalex ® 5140 e-b modifier | 10 | 10 |
| Irganox ® 1010 stabilizer | 0.2 | 0.2 |
| NA ® 11 nucleating agent | 0 | 0.3 |
| Ratio of oil/HSBC | 0.65 | 0.65 |

TABLE 2-continued

| | Example No. | |
|---|---|---|
| | 6 | 7 |
| Properties | | |
| Tensile strength, Mpa (psi) | 5.99 (868) | 6.40 (928) |
| Tear strength, N/mm (lb/in) | 31.7 (181) | 33.8 (193) |

Tuftec ® H1041 from Asahi Chemical is a SEBS having MFR of about 5 gm/10 min at 230° C. and a load of 2.16 Kg

EXAMPLES 8–11

The following examples demonstrates the effect of including an end-block modifier.

TABLE 3

| | Example No. | | | |
|---|---|---|---|---|
| | 8 | 9 | 10 | 11 |
| Kraton ® G6924 (SEBS) | 95 | 95 | 95 | 95 |
| Septon ® 4033 (SEEPS) | 5 | 5 | 5 | 5 |
| Drakeol ® 600 mineral oil | 70 | 70 | 70 | 70 |
| Fina ® 3860 PP homopolymer | 40 | 40 | 40 | 40 |
| Plastolyn ® 290 e-b modifier | 0 | 15 | 0 | 0 |
| Kristalex ® 5140 e-b modifier | 0 | 0 | 15 | 25 |
| Irganox ® 1010 stabilizer | 0.2 | 0.2 | 0.2 | 0.2 |
| Ratio of oil/HSBC | 0.7 | 0.7 | 0.7 | 0.7 |
| Properties | | | | |
| Hardness, Shore A | 55 | 55 | 53 | 55 |
| Tensile strength, Mpa (psi) | 4.69 (680) | 6.21 (900) | 5.56 (806) | 6.52 (945) |
| Tear strength, N/mm (lb/in) | 26.3 (150) | 29.8 (170) | 29.9 (171) | 28.9 (165) |

Plastolyn ® 290 and Kristalex ® 5140 are low molecular weight polystyrene-type modifiers obtained from Eastman Chemicals.

EXAMPLES 12–15

The following examples demonstrate the effect of vinyl content, "low" or "high", and molecular weight of the HSBC used, on hardness, tensile strength and clarity, all other ingredients being the same.

TABLE 4

| | Example No. | | | |
|---|---|---|---|---|
| | 12 | 13 | 14 | 15 |
| G1654 "low" (SEBS), high Mn | 95, wherein Mn = 200,000 | | | |
| GRP6917 "high"(SEBS), high Mn | | 95, wherein Mn = 290,000 | | |
| G1650 "low"(SEBS), low Mn, wherein Mn = 100,000 | | | 95 | |
| GRP6924 "high" (SEBS), low Mn, wherein Mn < 130,000 | | | | 95 |
| Septon ® 4033 (SEEPS) | 5 | 5 | 5 | 5 |
| Drakeol ® 600 mineral oil | 70 | 70 | 70 | 70 |
| Fina ® 3860 PP homopolymer | 40 | 40 | 40 | 40 |
| Irganox 1010 | 0.2 | 0.2 | 0.2 | 0.2 |

TABLE 4-continued

| | Example No. | | | |
|---|---|---|---|---|
| | 12 | 13 | 14 | 15 |
| Properties | | | | |
| Hardness, Shore A | 68 | 58 | 69 | 55 |
| Tensile strength, MPa, (psi) | 13.2 | 11.2 | 6.48 | 4.69 |
| Clarity, TP* or TL* | TL | TL | TP | TP |

*TP = transparent;
*TL = translucent

What is claimed is:

1. A thermoplastic, injection-moldable and recyclable composition consisting essentially of at least one triblock copolymer selected from the group consisting of
   (a) a substantially colorless hydrogenated first styrene-conjugated diene-styrene block copolymer (HSBC) derived by hydrogenation of a triblock copolymer selected from the group consisting of high vinyl (styrene-butadiene-styrene) (SBS), high vinyl (styrene-isoprene-styrene) (SIS) and high vinyl (styrene-isoprene/butadiene-styrene) (SI/BS) to yield polystyrene-b-poly(ethylene/butylene)-b-polystyrene (high vinyl SEBS), polystyrene-b-poly(ethylene/propylene-3-methylbutene)-b-polystyrene (SEPS), and "polystyrene-b-poly(ethylene-ethylene/propylene)-b-polystyrene (SEEPS), respectively, each triblock having at least 51 mole percent of the butadiene midblock polymerized at the 1,2-position, and/or at least 51 mole percent of the isoprene polymerized at the 3,4-position, wherein (a) has a resultant effective number average molecular weight (Mn) measured by gas permeation chromatography (GPC), lower than 130,000; and
   (b) a blend of (a) with a second substantially colorless SEEPS present in a minor proportion relative to the first HSBC (a), wherein the second SEEPS is optionally high vinyl and (b) has a resultant effective number average molecular weight (Mn) measured by gas permeation chromatography (GPC), lower than 130,000;
   a minor proportion by weight, relative to the amount of (a) or the combined amount of (a) and (b), of a polyolefinic modifier providing a continuous phase in the TPE, the polyolefinic modifier being selected from the group consisting of polypropylene homopolymer, and a copolymer of propylene with another lower olefin having from 2 to 6 carbon atoms, the modifier having a melt viscosity in the range from 1 to 150 gm/10 min as measured at 230° C. under a load of 2.16 kg in accordance with ASTM D1238;
   a minor proportion by weight, relative to the amount of (a) or the combined amount of (a) and (b), of a substantially colorless plasticizer or softening agent compatible with rubbery phases of the foregoing;
   a minor proportion by weight relative to either (a), or (a) and (b), of an end block modifier which associates with the polystyrene, the end block modifier having a glass transition temperature Tg higher than 60° C., a MMAP cloud point<30° C. and a weight average molecular weight Mw in the range from 2,000 to 50,000; and,
   at least one additive to enhance useful life of the composition.

2. The compositon of claim 1 wherein the propylene has a melt flow rate of from 5 to 100 gm/10 min as measured at 230° C. under a load of 2.16 kg in accordance with ASTM D1238; and the end block modifier has a Mw in the range from about 10,000 to 20,000.

3. The composition of claim 2 wherein only the first HSBC is present and it has a number average molecular weight in the range from about 60,000 to 125,000.

4. The composition of claim 2 wherein both, first and second HSBCs are present, the first HSBC is present in a major amount relative to the second, and the second HSBC is hydrogenated poly(styrene-b-isoprene/butadiene-b-styrene) (SEEPS) having a number average molecular weight in the range from about 60,000 to 100,000.

5. The composition of claim 4 wherein at least a portion of the hydrogenated poly(styrene-b-isoprene/butadiene-b-styrene) (SEEPS) present is high vinyl.

6. The composition of claim 2, when injection molded, has tensile strength in the range from about 4.13 to 8.96 MPa (600 to 1300 psi); tear strength in the range from about 21 to 52.6 N/mm (120 to 300 lbs/in); softness in the range from about 45 Shore A but less than 65 Shore A; and haze lower than 20%, measured by ASTM D1003 using a BYK Gardner Micro Tri-gloss 4525 meter; and the aforesaid properties, along with the physical dimensions of a molded article, remain substantially unchanged after immersion of the article in boiling water for 1 hour.

7. The composition of claim 6 wherein
   blend (b) has a major amount by weight of SEBS and a minor amount of SEEPS with a resultant effective Mn in the range from about 60,000 to lower than 130,000;
   25 to 50 parts by weight of polypropylene having a melt flow rate of from 10 to 50 gm/10 min as measured at 230° C. under a load of 2.16 kg in accordance with ASTM D1238; and remaining ingredients of the composition include
   45 to 90 parts by weight of a substantially colorless hydrocarbon oil having a kinematic viscosity at 40° C. in the range from 10 to 1000 mm$^2$/sec.;
   5 to 20 parts by weight of the end block modifier; and,
   one or more additives including a nucleating agent to control the size of domains, and a stabilizer to enhance the useful life of the molded product.

8. The composition of claim 2 wherein polystyrene domains are enriched with a vinylaromatic end block modifier having a Tg in the range from 80° C. to 120° C.

9. A recyclable, thermoformed, substantially clear and soft, shaped article comprising,
   a thermoformed blend consisting essentially of at least one triblock copolymer selected from the group consisting of (a) a substantially colorless hydrogenated first styrene-conjugated diene-styrene block copolymer (HSBC) derived by hydrogenation of a triblock copolymer selected from the group consisting of high vinyl (styrene-butadiene-styrene) (SBS), high vinyl (styrene-isoprene-styrene) (SIS) and high vinyl (styrene-isoprene/butadiene-styrene) (SI/BS) to yield polystyrene-b-poly(ethylene/butylene)-b-polystyrene (high vinyl SEBS), polystyrene-b-poly(ethylene/propylene-3-methylbutene)-b-polystyrene (SEPS), and "polystyrene-b-poly(ethylene-ethylene/propylene)-b-polystyrene (SEEPS), respectively, each triblock having at least 51 mole percent of the butadiene midblock polymerized at the 1,2-position, and/or at least 51 mole percent of the isoprene polymerized at the 3,4-position, wherein (a) has a resultant effective number average molecular weight (Mn) measured by gas permeation chromatography (GPC), lower than 130,000; and
   (b) a blend of (a) with a second substantially colorless SEEPS present in a minor proportion relative to the first HSBC (a), wherein the second SEEPS is optionally high vinyl and (b) has a resultant effective number average molecular weight (Mn) measured by gas permeation chromatography (GPC), lower than 130,000;

a minor proportion by weight, relative to the amount of (a) or the combined amount of (a) and (b), of a polyolefinic modifier providing a continuous phase in the TPE, the polyolefinic modifier being selected from the group consisting of polypropylene homopolymer, and a copolymer of propylene with another lower olefin having from 2 to 6 carbon atoms, the modifier having a melt viscosity in the range from 1 to 150 gm/10 min as measured at 230° C. under a load of 2.16 kg in accordance with ASTM D1238;

a minor proportion by weight, relative to the amount of (a) or the combined amount of (a) and (b), of a substantially colorless plasticizer or softening agent compatible with rubbery phases of the foregoing;

a minor proportion by weight relative to either (a), or (a) and (b), of an end block modifier which associates with the polystyrene, the end block modifier having a glass transition temperature Tg higher than 60° C., a MMAP cloud point<30° C. and a weight average molecular weight Mw in the range from 2,000 to 50,000; and, at least one additive to enhance the useful life of the shaped article.

10. The article of claim 9 having a shape mouthable by an infant, tensile strength in the range from about 4.13 to 8.96 MPa (600 to 1300 psi); tear strength in the range from about 21 to 52.6 N/mm (120 to 300 lbs/in); softness in the range from about 45 Shore A but less than 65 Shore A; and haze lower than 20%, measured by ASTM D1003 using a BYK Gardner Micro Tri-gloss 4525 meter; and the aforesaid properties, along with the physical dimensions of a molded article, remain substantially unchanged after immersion of the article in boiling water for 1 hour.

11. The article of claim 10 including a nipple body having the general shape of an inverted cylindrical truncated cone and including an integrally formed teat with an upper wall and annular flange at the base of the teat, the inner periphery of the flange being integrally joined to the teat with a smooth gently flaring curved wall.

12. The article of claim 11 wherein the teat has a central through-aperture in the teat's upper wall.

13. The article of claim 11 wherein the flange is integrally formed with an arcuate teething ring having a generally circular cross-section.

14. A method for preparing a thermoplastic article, comprising, blending together at least one triblock copolymer selected from the group consisting of (a) a substantially colorless hydrogenated first styrene-conjugated diene-styrene block copolymer (HSBC) derived by hydrogenation of a triblock copolymer selected from the group consisting of high vinyl (styrene-butadiene-styrene) (SBS), high vinyl (styrene-isoprene-styrene) (SIS) and high vinyl (styrene-isoprene/butadiene-styrene) (SI/BS) to yield polystyrene-b-poly(ethylene/butylene)-b-polystyrene (high vinyl SEBS), polystyrene-b-poly(ethylene/propylene-3-methylbutene)-b-polystyrene (SEPS), and "polystyrene-b-poly(ethylene-ethylene/propylene)-b-polystyrene (SEEPS), respectively, each triblock having at least 51 mole percent of the butadiene midblock polymerized at the 1,2-position, and/or at least 51 mole percent of the isoprene polymerized at the 3,4-position, wherein (a) has a resultant effective number average molecular weight (Mn) measured by gas permeation chromatography (GPC), lower than 130,000; and (b) a blend of (a) with a second substantially colorless SEEPS present in a minor proportion relative to the first HSBC (a), wherein the second SEEPS is optionally high vinyl and (b) has a resultant effective number average molecular weight (Mn) measured by gas permeation chromatography (GPC), lower than 130,000;

a minor proportion by weight, relative to the amount of (a) or the combined amount of (a) and (b), of a polyolefinic modifier providing a continuous phase in the TPE, the polyolefinic modifier being selected from the group consisting of polypropylene homopolymer, and a copolymer of propylene with another lower olefin having from 2 to 6 carbon atoms, the modifier having a melt viscosity in the range from 1 to 150 gm/10 min as measured at 230° C. under a load of 2.16 kg in accordance with ASTM D1238;

a minor proportion by weight, relative to the amount of (a) or the combined amount of (a) and (b), of a substantially colorless plasticizer or softening agent compatible with rubbery phases of the foregoing;

a minor proportion by weight relative to either (a), or (a) and (b), of an end block modifier which associates with the polystyrene, the end block modifier having a glass transition temperature Tg higher than 60° C., a MMAP cloud point<30° C. and a weight average molecular weight Mw in the range from 2,000 to 50,000; and, at least one additive to enhance useful life of the article; and, thermoforming the blend at a temperature above the melt flow temperature of the blend.

* * * * *